United States Patent
Huang et al.

(10) Patent No.: US 9,413,227 B2
(45) Date of Patent: Aug. 9, 2016

(54) CONVERTER CIRCUIT WITH POWER FACTOR CORRECTION FOR CONVERTING AC INPUT VOLTAGE INTO DC OUTPUT VOLTAGE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chin-chuan Huang, Hsinchu (TW); Wei-Ru Chen, Tainan (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 14/504,779

(22) Filed: Oct. 2, 2014

(65) Prior Publication Data
US 2015/0318781 A1    Nov. 5, 2015

(30) Foreign Application Priority Data

Apr. 30, 2014 (CN) .......................... 2014 1 0183153

(51) Int. Cl.
*H02M 3/315* (2006.01)
*H02M 1/44* (2007.01)
*H02M 1/42* (2007.01)
*H02M 7/12* (2006.01)

(52) U.S. Cl.
CPC .............. *H02M 1/44* (2013.01); *H02M 1/4208* (2013.01); *H02M 1/4225* (2013.01); *H02M 7/12* (2013.01); *Y02B 70/126* (2013.01)

(58) Field of Classification Search
CPC ....................................................... H02M 7/12
USPC ........... 363/17, 21, 37, 34, 39, 44, 47, 48, 56, 363/56.12, 59, 81, 89, 123, 126, 127; 323/222; 307/43, 109, 110
See application file for complete search history.

(56) References Cited

U.S. PATENT DOCUMENTS

| | | | | |
|---|---|---|---|---|
| 5,402,329 A * | 3/1995 | Wittenbreder, Jr. | ..................... | H02M 3/33576 363/127 |
| 5,416,387 A * | 5/1995 | Cuk | ..................... | H05B 41/282 315/209 R |
| 6,008,589 A * | 12/1999 | Deng | ..................... | H02M 1/425 315/205 |
| 6,118,673 A * | 9/2000 | Hua | ..................... | H02M 1/4258 363/56.11 |
| 7,085,145 B2 * | 8/2006 | Sheehy | ..................... | H02J 7/345 363/44 |
| 7,355,368 B2 * | 4/2008 | Salato | ..................... | H02M 1/36 323/222 |
| 7,489,116 B2 * | 2/2009 | Lanni | ..................... | H02M 1/4208 323/222 |

(Continued)

*Primary Examiner* — Adolf Berhane
*Assistant Examiner* — Nusrat Quddus
(74) *Attorney, Agent, or Firm* — Li & Cai Intellectual Property (USA) Office

(57) ABSTRACT

A converter circuit with power factor correction comprises an alternative current (AC) voltage source, a bidirectional AC switch circuit, a first un-bidirectional channel circuit, a second un-bidirectional channel circuit, a first energy storing circuit, a second energy storing circuit and an output circuit. When the bidirectional AC switch circuit is on-state, at least one of the first energy storing circuit and the second energy storing circuit is charged by an AC input current and then energy is stored with magnetic flux form. When the bidirectional AC switch circuit is off-state, at least one of the first energy storing circuit and the second energy storing circuit releases the energy to the output circuit.

16 Claims, 11 Drawing Sheets

(56) References Cited

U.S. PATENT DOCUMENTS

| | | | | |
|---|---|---|---|---|
| 7,557,546 B2* | 7/2009 | Uruno | ............... | H02M 3/158 323/225 |
| 7,663,898 B2* | 2/2010 | Lindemann | ......... | H02M 7/1557 323/222 |
| 7,848,121 B2* | 12/2010 | Kojori | ............... | H02M 1/32 363/37 |
| 7,855,524 B2* | 12/2010 | Pummer | ............... | G05F 1/70 318/438 |
| 8,860,396 B2* | 10/2014 | Giuliano | ............ | H02M 3/158 323/266 |
| 9,036,376 B2* | 5/2015 | Lawson | ............... | H02J 3/32 363/21.12 |
| 2006/0221653 A1* | 10/2006 | Lai | ............... | H02M 5/225 363/37 |
| 2010/0046259 A1* | 2/2010 | Ho | ............... | H02M 7/217 363/126 |
| 2013/0249472 A1* | 9/2013 | Hsu | ............... | H02M 7/797 320/107 |
| 2014/0184140 A1* | 7/2014 | Lee | ............... | H02J 7/0054 320/103 |
| 2015/0236608 A1* | 8/2015 | Liu | ............... | H02M 7/06 363/126 |

* cited by examiner

CONVERTER CIRCUIT WITH POWER FACTOR CORRECTION FOR CONVERTING AC INPUT VOLTAGE INTO DC OUTPUT VOLTAGE

BACKGROUND

1. Technical Field

The present disclosure relates to a power converter, and more particularly to a converter circuit with power factor correction, which raises the power converting efficiency and controls the input inrush current.

2. Description of Related Art

Recently, the switch power supply industry is growing rapidly, because it plays a most important role in the electronic apparatus. The switch power supply has the advantages of stability, simplicity, and efficiency when compared with the traditional power supply. When attention is paid to environmental protection and the energy saving, the trend about improvement of the alternating current (AC) isolated-switch power supply appears to be going to the topology of synchronous converting controlling in the secondary side and the power factor correction in the primary side.

The DC voltage is utilized in many electronic apparatuses. Since the supply terminal of Mains is the AC voltage, the electronic apparatus needs to perform AC-to-DC converting. For reducing the reactive power of the power system and current harmonic that interferes with the system, the electronic apparatus has been requested to have high power factor and low current harmonic, so the power factor corrector (PFC) is utilized universally. The PFC in common use is grouped in active type or passive type according to whether it includes an initiative switch wherein. Although each of the two types have advantages, there still exists the defect of bad current harmonic, low converting efficiency, big volume of the storage unit, or complicated way of control.

The power factor corrector including the bridge converter has become the main loss of high efficiency AC-DC power converter due to the voltage drop of the high forward-conduction voltage on the converting diode. In the traditional way, the converting diode is replaced by the Metal-Oxide-Semiconductor Field-Effect Transistor (MOSFET). However, the high output voltage outputted by the traditional boost bridgeless PFC causes the rear stage DC-DC power converter to need to endure more high voltage stress and extra circuit to control the input inrush current, so the problem in administration and increased cost emerges. For resolving the above problem, the buck PFC circuit is further utilized. However, there still exists serious problems such as zero crossing distortion (ZCS) or dead zone, and also emerging is a total harmonic distortion and low power factor.

SUMMARY

Therefore, the present invention is to provide a converter circuit with power factor correction, in particular to a bridgeless design. The converter circuit avoids breaking an output capacitor when AC input voltage is over high, and increases a region of the AC input voltage. Thus, the converter circuit can reduce voltage stress, increase life, increase power converting efficiency, and control input inrush current, and further curb an arc that occurs when the power is plugged or unplugged.

In one embodiment of the present disclosure, the zero crossing distortion can be cancelled by a coupling effect between inductors, to decrease the total harmonic distortion and increase the power factor.

An exemplary embodiment of the present disclosure provides a converter circuit with power factor correction, configured for converting an AC input voltage into a DC output voltage. The converter circuit comprises an AC voltage source, a bidirectional AC switch circuit, a first un-bidirectional channel circuit, a first energy storing circuit, a second un-bidirectional channel circuit, a second energy storing circuit, and an output circuit. The AC voltage source is configured for operatively outputting the AC input voltage and an AC input current. The bidirectional AC switch circuit electronically connects to an end of the AC voltage source. The bidirectional AC switch circuit receives a first control signal and a second control signal, and controls the input inrush current. An end of the first un-bidirectional channel circuit electronically connects to the bidirectional AC switch circuit. An end of the first energy storing circuit electronically connects to the first un-bidirectional channel circuit, and the first energy storing circuit is configured for storing energy. An end of the second un-bidirectional channel circuit electronically connects to another end of the first un-bidirectional channel circuit, and another end of the second un-bidirectional channel circuit electronically connects to another end of the AC voltage source. An end of the second energy storing circuit electronically connects to another end of the second un-bidirectional channel circuit, and another end of the second energy storing circuit electronically connects to another end of the first energy storing circuit, and the second energy storing circuit is configured for storing energy. An end of the output circuit electronically connects to another end of the first un-bidirectional channel circuit, and another end of the output circuit electronically connects to another end of the first energy storing circuit, wherein the output circuit operatively outputs the DC output voltage.

When the bidirectional AC switch circuit is on-state, at least one of the first energy storing circuit and the second energy storing circuit is charged by the AC input current and then energy is stored with magnetic flux form; when the bidirectional AC switch circuit is off-state, at least one of the first energy storing circuit and the second energy storing circuit releases the energy to the output circuit.

To sum up, in the converter circuit with power factor correction provided by the present disclosure, when the bidirectional AC switch circuit is on-state, at least one of the first energy storing circuit and the second energy storing circuit is charged by the AC input current and then energy is stored with magnetic flux form; when the bidirectional AC switch circuit is off-state, at least one of the first energy storing circuit and the second energy storing circuit releases the energy to the output circuit. Therefore, the converter circuit avoids breaking an output capacitor when AC input voltage is over high, and increases a region of the AC input voltage. In addition, the converter circuit can reduce the voltage stress, increase the life, increase the power converting efficiency, and control the input inrush current. Furthermore, the converter circuit with power factor correction further curbs the arc that occurs when the power is plugged or unplugged.

In order to further understand the techniques, means and effects of the present disclosure, the following detailed descriptions and appended drawings are hereby referred to, such that, and through which, the purposes, features and aspects of the present disclosure can be thoroughly and concretely appreciated, however, the appended drawings are merely provided for reference and illustration, without any intention that they be used for limiting the present disclosure.

BRIEF DESCRIPTION OF THE DRAWINGS

The accompanying drawings are included to provide a further understanding of the present disclosure, and are incor

DESCRIPTION OF THE EXEMPLARY EMBODIMENTS

Figure 1:
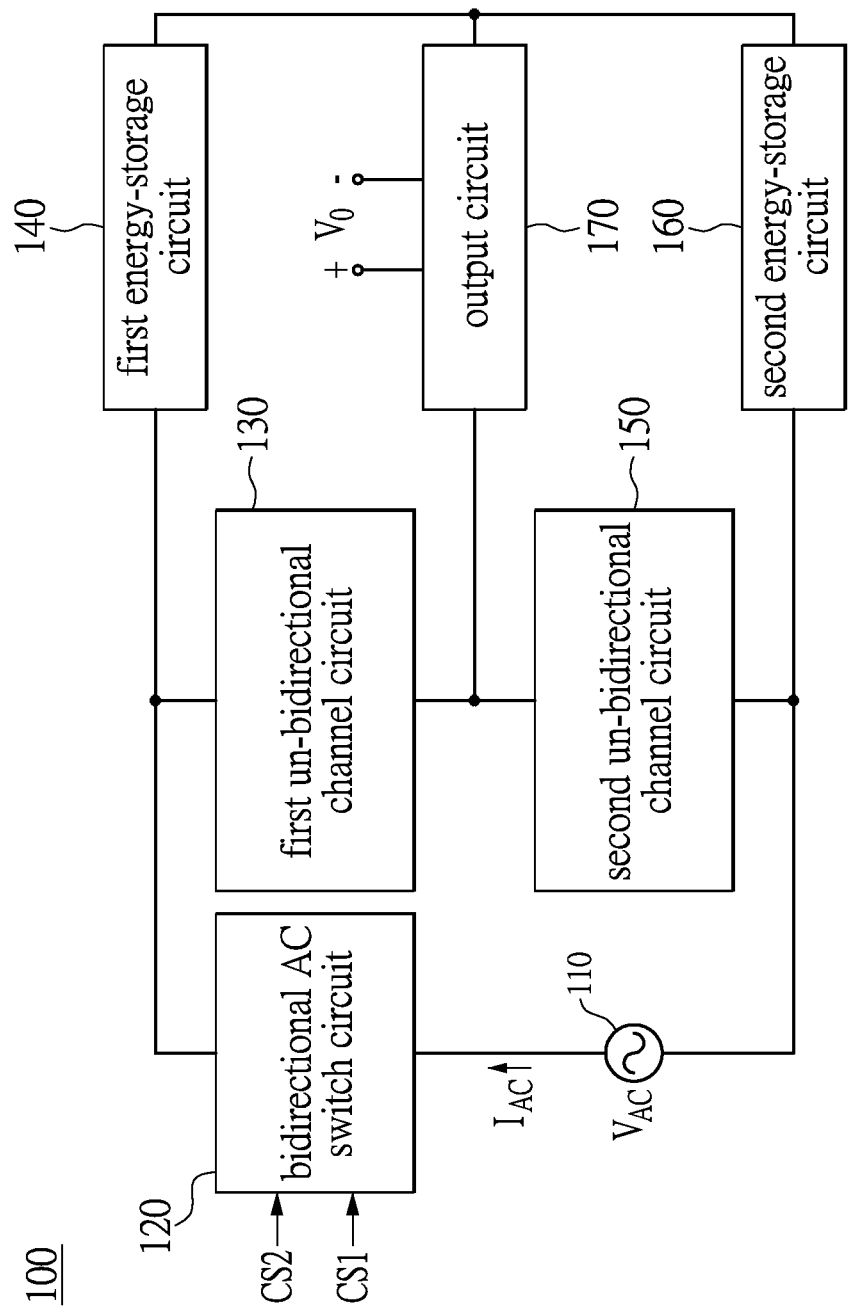
- FIG. 1 is a block diagram of a converter circuit with power factor correction provided according to the present disclosure.

The topology of the power factor correction develops into the bridgeless design. The bridgeless power factor corrector is the commonly-shared circuit, and replaces the way of traditional bridge converter and power factor correction being separated, so as to reduce the forward-conduction voltage of the bridge converter to increase the efficiency of the power supply.

Before the present invention is described in greater detail, it should be noted that like elements are denoted by the same reference numerals throughout the disclosure. As used herein, the term "or" includes any and all combinations of one or more of the associated listed items.

Referring to FIG. 1, the present disclosure discloses a converter circuit 100 with power factor correction configured for converting an AC input voltage $V_{AC}$ into a DC output voltage $V_O$ (e.g., AC-DC converting). Compared with the conventional knowledge, the present disclosure saves a full-bridge converting diode (the diode will generate a conduction loss to effect the whole converting efficiency) to reduce the components and raise the whole efficiency of the power converter. In other words, the present disclosure reduces the diodes which are disposed on the current path, and decreases voltage drop and power loss caused in the converting process. Additionally, the converter circuit 100 provided by the present disclosure can control the input inrush current by a bidirectional AC switch circuit 120.

FIG. 1 shows the converter circuit 100 with a power factor correction includes an AC voltage source 110, the bidirectional AC switch circuit 120, a first un-bidirectional channel circuit 130, a first energy storing circuit 140, a second un-bidirectional channel circuit 150, a second energy storing circuit 160, and an output circuit 170. The AC voltage source 110 is configured for operatively outputting the AC input voltage $V_{AC}$ and an AC input current $I_{AC}$. The bidirectional AC switch circuit 120 electronically connects to an end of the AC voltage source 110. The bidirectional AC switch circuit 120 receives a first control signal CS1 and a second control signal CS2, and is switched between first state and second state. The first state and the second state can be one of on-state or off-state, but is not limited thereto. Furthermore, the bidirectional AC switch circuit 120 can control an input inrush current. An end of the first un-bidirectional channel circuit 130 electronically connects to the bidirectional AC switch circuit 120. The first un-bidirectional channel circuit 130 is configured for preventing the cyclic current. An end of the first energy storing circuit 140 electronically connects to the first un-bidirectional channel circuit 130. The first energy storing circuit 140 is configured for storing energy. In one of the embodiments, the first energy storing circuit 140 is configured for storing energy with magnetic flux form. An end of the second un-bidirectional channel circuit 150 electronically connects to another end of the first un-bidirectional channel circuit 130, and another end of the second un-bidirectional channel circuit 150 electronically connects to another end of the AC voltage source 110. The second un-bidirectional channel circuit 150 is configured for preventing the cyclic current. An end of the second energy storing circuit 160 electronically connects to another end of the second un-bidirectional channel circuit 150, and another end of the second energy storing circuit 160 electronically connects to another end of the first energy storing circuit 140. The second energy storing circuit 160 is configured for storing the energy. In one of the embodiments, the first energy storing circuit 160 is configured for storing the energy with magnetic flux form. An end of the output circuit 170 electronically connects to another end of the first un-bidirectional channel circuit 130, and another end of the output circuit 170 electronically connects to another end of the first energy storing circuit 140. The output circuit 170 operatively outputs the DC output voltage $V_O$. Thus, when the bidirectional AC switch circuit 120 is switched between the first state or the second state, the bidirectional AC switch circuit 120 stores the energy or releases the energy.

In this embodiment, when the bidirectional AC switch circuit 120 is on-state as long as the AC input voltage $V_{AC}$ is a positive part of a wave, at least one of the first energy storing circuit 140 and the second energy storing circuit 160 is charged by the AC input current $I_{AC}$ and then energy is stored (e.g. with magnetic flux form). When the bidirectional AC switch circuit 120 is off-state as long as the AC input voltage $V_{AC}$ is the positive part of the wave, at least one of the first energy storing circuit 140 and the second energy storing circuit 160 releases the energy to the output circuit 170. On the other hand, when the bidirectional AC switch circuit 120 is on-state as long as the AC input voltage $V_{AC}$ is a negative part of the wave, at least one of the first energy storing circuit 140 and the second energy storing circuit 160 is charged by the AC input current $I_{AC}$, when the bidirectional AC switch circuit is off-state as long as the AC input voltage $V_{AC}$ is the negative part of the wave, at least one of the first energy storing circuit 140 and the second energy storing circuit 160 releases the energy to the output circuit 170.

For helpfully understanding the converter circuit with 100 with a power factor correction of the present disclosure, there is given a plurality of examples to illustrate as following. Just the different parts from FIG. 1 are illustrated, and anything else is omitted.

Figure 2:
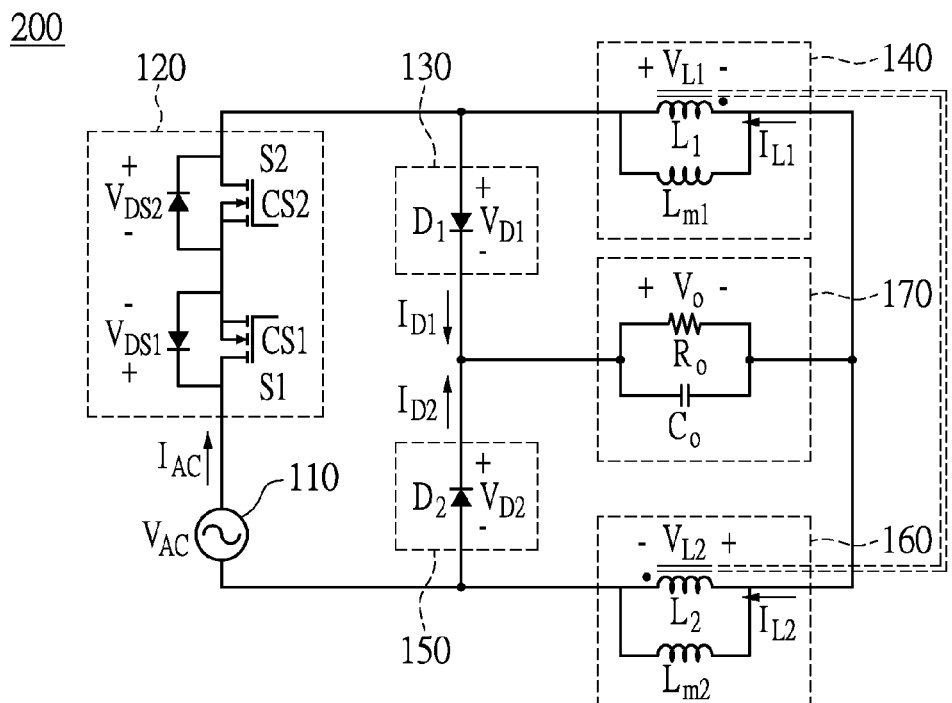
FIG. 2 is a detail circuit diagram of the converter circuit with the power factor correction provided according to the present disclosure.

FIG. 2. Shows the second embodiment of the converter circuit 200 of the present invention. The difference compared with FIG. 1 is that the converter circuit with power factor can be a bridgeless power factor corrector (e.g., Boost-Buck PFC Circuit). Shown as FIG. 2, the bidirectional AC switch circuit 120 includes a first power switch S1 and a second power switch S2. The first un-bidirectional channel circuit 130 includes a first free-wheeling diode $D_1$. The second un-bidirectional channel circuit 150 includes a second free-wheeling diode $D_2$. The output circuit 170 includes an output resistor $R_O$ and an output capacitor $C_O$. The first energy storing circuit 140 includes a first inductor $L_1$ and a first magnetizing inductor $L_{m1}$, the second energy storing circuit 160 includes a second inductor $L_2$ and a second magnetizing inductor $L_{m2}$. The first power switch S1 and the second power switch S2 include a first body diode and a second body diode respectively, and conduction voltages corresponding to the first power switch S1 and second power switch S2 are $V_{DS1}$ and $V_{DS2}$. Additionally, conduction voltages corresponding to the first free-wheeling diode $D_1$ and the second free-wheeling diode $D_2$ are $V_{D1}$ and $V_{D2}$.

The gate of the first power switch S1 receives the first control signal CS1, the drain of the first power switch S1 couples to the end of the AC voltage source 110. The gate of the second power switch S2 receives the second control signal CS2, the source of the second power switch S2 couples to the source of the first power switch S1, the drain of the second power switch S2 couples to the end of the first un-bidirectional channel circuit 130. The anode of the first free-wheeling diode $D_1$ couples to the drain of the second power switch S2, the cathode of the first free-wheeling diode $D_1$ couples to the end of the second un-bidirectional channel circuit 150. The anode of the second free-wheeling diode $D_2$ couples to another end of the AC voltage source 110, the cathode of the second free-wheeling diode $D_2$ couples to the cathode of the first free-wheeling diode S1. An end of the output resistor $R_O$ couples to the cathode of the second free-wheeling diode S2, another end of the output resistor $R_O$ couples to another end of the first energy storing circuit 140, two ends of the output resistor $R_O$ generates the DC output voltage $V_O$. An end of the output capacitor $C_O$ couples to the cathode of the second free-wheeling diode $D_2$, and another end of the output capacitor $C_O$ couples to another end of the first energy storing circuit 140. An end of the first inductor $L_1$ couples to the anode of the first free-wheeling diode $D_2$, another end of the first inductor $L_1$ couples to another end of the output resistor $R_O$ and has a common-polarity input terminal. A first magnetizing inductor $L_{m1}$ parallel connects to the first inductor $L_1$. An end of the second inductor $L_2$ couples to the anode of the second free-wheeling diode $D_2$, another end of the second inductor $L_2$ couples to another end of the output resistor $R_O$ and has a common-polarity output terminal. A second magnetizing inductor $L_{m2}$ parallel connects to the second inductor $L_2$. The first inductor $L_1$ and the second inductor $L_2$ are in different windings and use the shared core to form a transformer. In this embodiment, the first inductor $L_1$ and the second inductor $L_2$ have a mutual effect or a coupling effect therebetween. Thus, the converter circuit 200 cancels a zero crossing distortion by the coupling effect between the first inductor $L_1$ and the second inductor $L_2$ to decrease the total harmonic distortion and increase the power factor.

In the embodiment, the state of the first power switch S1 is decided according to a level of the first control signal CS1 to be on-state or off-state. The state of the second power switch S2 is decided according to a level of the second control signal CS2 to be on-state or off-state. The first power switch S1 and the second power switch S2 are back to back bidirectional channel switches, and also are N-type metal-oxide-semiconductor transistors. Furthermore, the first magnetizing inductor $L_{m1}$ and the second magnetizing inductor $L_{m2}$ are configured for storing energy (e.g., stored with magnetic flux form).

Next, the operation of the converter circuit 200 with the power factor correction is illustrated.

Figure 3:
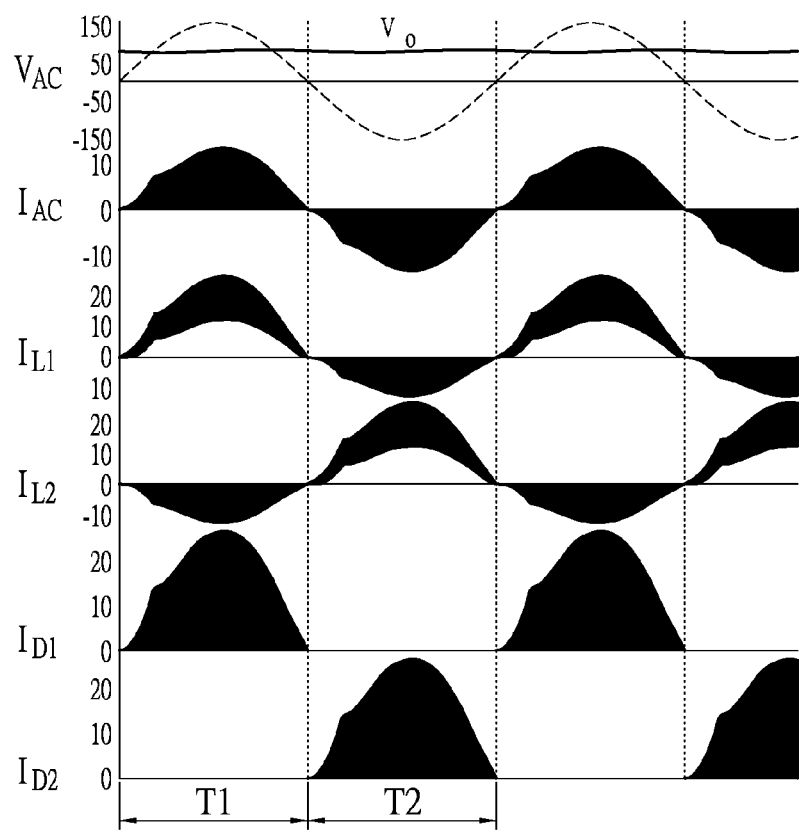
FIG. 3 is a signal wave diagram between voltage and current on the converter circuit with the power factor correction provided according to the present disclosure.
Figure 4:
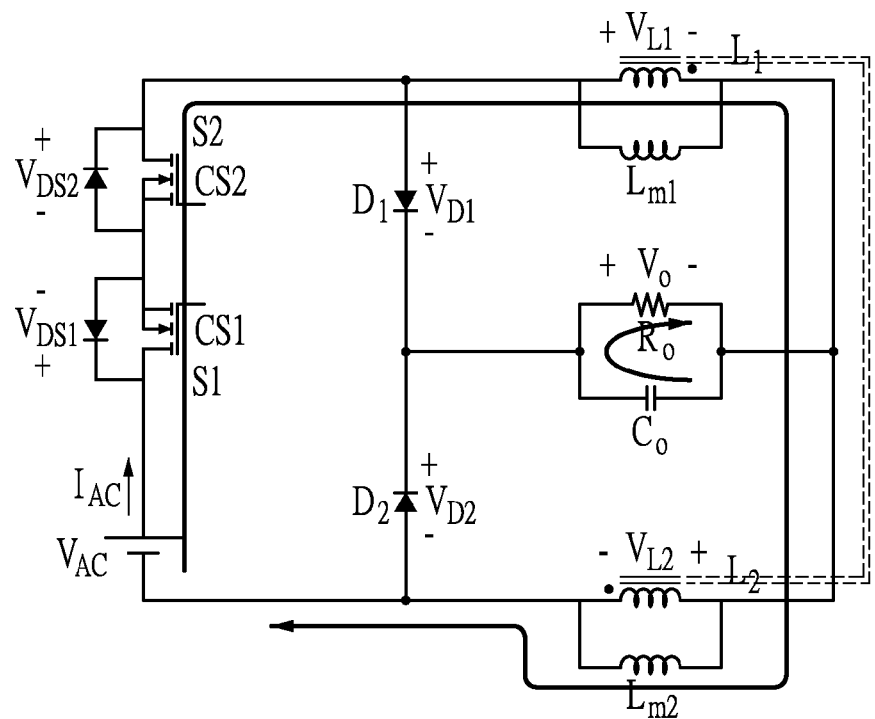
FIG. 4 and FIG. 5 are signal operation diagrams about the AC input voltage on the converter circuit with the power factor correction provided according to the present disclosure being the positive part of a wave.
Figure 5:
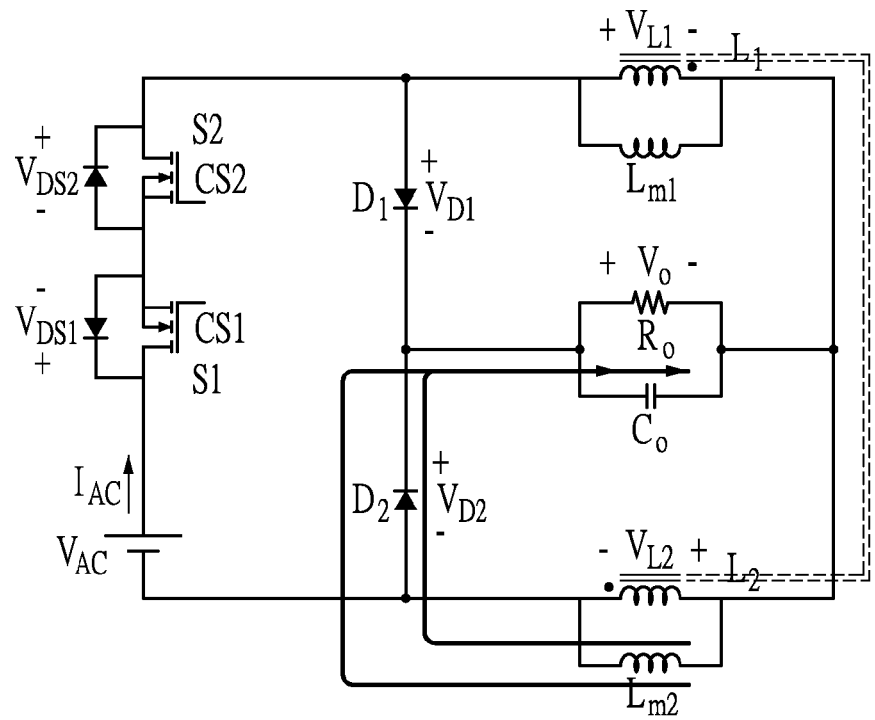

Referring to FIG. 4 and FIG. 5 in conjunction with FIG. 3. FIG. 3 is a signal wave diagram between voltage and current on the converter circuit with the power factor correction provided according to the present disclosure. FIG. 4 and FIG. 5 are signal operation diagrams about the AC input voltage on the converter circuit with the power factor correction provided according to the present disclosure being the positive part of a wave. In the period time T1, when the first power switch S1 and the second power switch S2 are on-state as long as the AC input voltage $V_{AC}$ is the positive part of the wave, the first magnetizing inductor $L_{m1}$ and the second magnetizing inductor $L_{m2}$ are charged by the AC input current $I_{AC}$ through the path formed by the first power switch S1, the second power switch S2, the first magnetizing inductor $L_{m1}$ and the second magnetizing inductor $L_{m2}$ in order (shown as FIG. 4), wherein the first inductor $L_1$ and the second inductor $L_2$ have inductor voltages $V_{L1}$ and $V_{L2}$ respectively. In the same period time T1, when the first power switch S1 and the second power switch S2 are off-state as long as the AC input voltage $V_{AC}$ is the positive part of the wave, the second magnetizing inductor $L_{m2}$ releases the energy to the output resistor $R_O$ and the output capacitor $C_O$ by the second free-wheeling diode $D_2$ (by double inductor current $I_{L2}$), wherein the first inductor $L_1$ releases the energy to the second inductor $L_2$ by the coupling effect (shown as FIG. 5).

Figure 6:
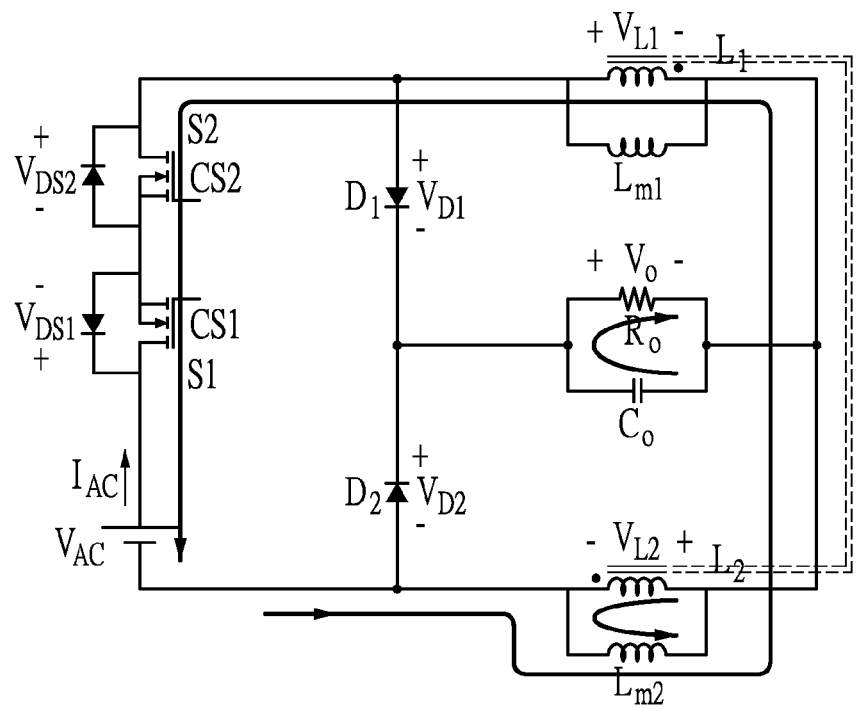
FIG. 6 and FIG. 7 are signal operation diagrams about the AC input voltage on the converter circuit with the power factor correction provided according to the present disclosure being the negative part of the wave.
Figure 7:
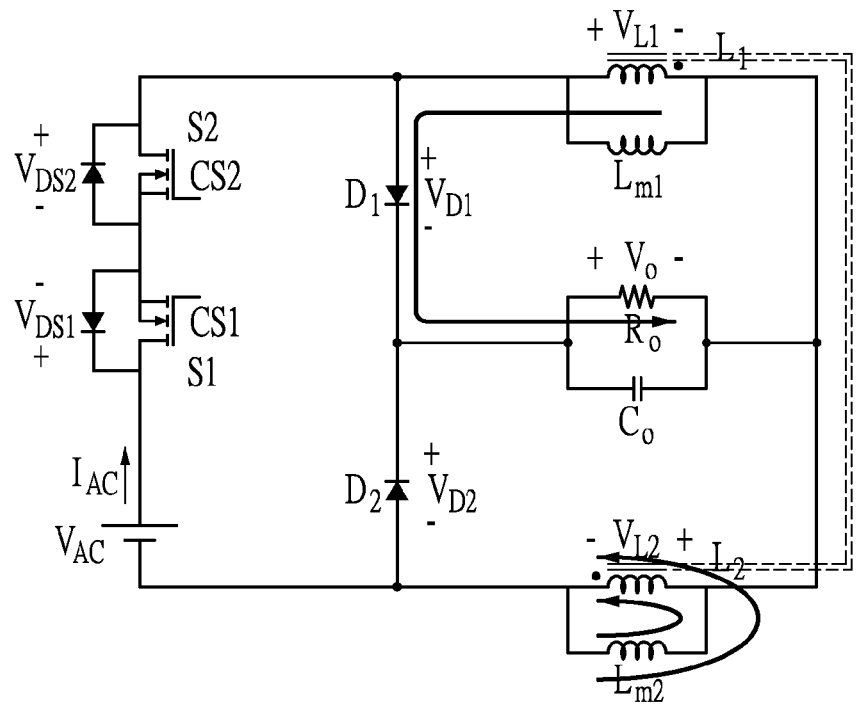

Referring to FIG. 6 and FIG. 7 in conjunction with FIG. 3. FIG. 6 and FIG. 7 are signal operation diagrams about the AC input voltage on the converter circuit with the power factor correction provided according to the present disclosure being the negative part of the wave. In the period time T2, when the first power switch S1 and the second power switch S2 are on-state as long as the AC input voltage $V_{AC}$ is the negative part of the wave, the first magnetizing inductor $L_{m1}$ and the second magnetizing inductor $L_{m2}$ are charged by the AC input current $I_{AC}$ through the path formed by the second magnetizing inductor $L_{m2}$, the first magnetizing inductor $L_{m1}$, the second power switch S2 and the first power switch S1 in order (shown as FIG. 6). In the same period time T2, when the first power switch S1 and the second power switch S2 are off-state as long as the AC input voltage $V_{AC}$ is the negative part of the wave, the first magnetizing inductor $L_{m1}$ releases the energy to the output resistor $R_O$ and the output capacitor $C_O$ by the first free-wheeling diode $D_1$ (by double inductor current $I_{L1}$), wherein the second inductor $L_2$ releases the energy to the first inductor $L_1$ by the coupling effect (shown as FIG. 7). It is worth noting, when the AC input voltage $V_{AC}$ is less than the DC output voltage $V_O$, the converter circuit 200 with the power factor correction cancels the zero crossing distortion by the coupling effect between the first inductor $L_1$ and the second inductor $L_2$ to decrease the total harmonic distortion and increase the power factor. Therefore, the converter circuit 200 avoids breaking an output capacitor when AC input voltage is over high, and increases a region of the AC input voltage. In addition, the converter circuit 200 can reduce the voltage stress, increase the life, and increase the power converting efficiency.

Figure 8:
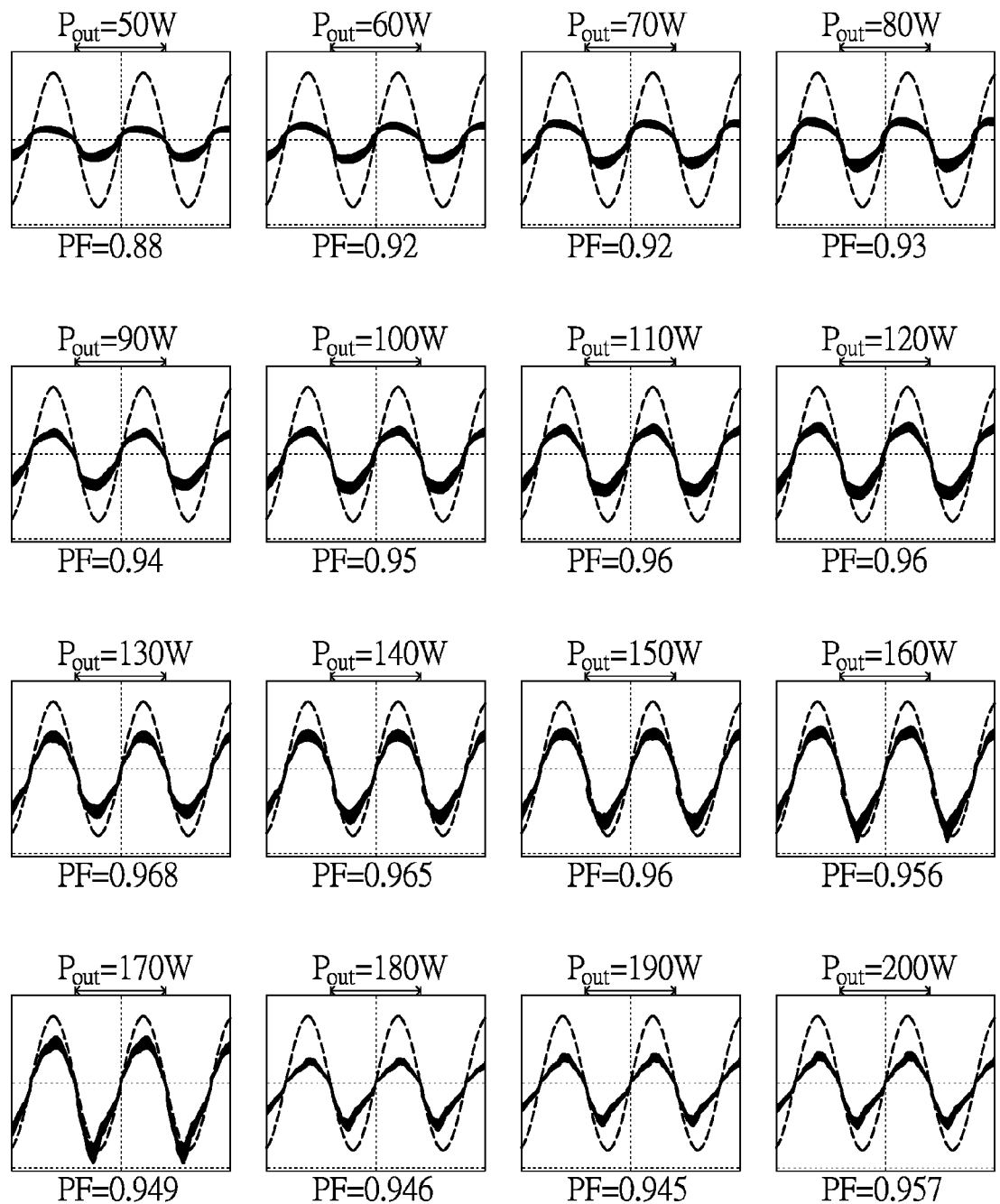
FIG. 8 is a power factor correcting simulation diagram of a converter circuit with the power factor correction provided according to the present disclosure.

Referring to FIG. 8. FIG. 8 is a power factor correcting simulation diagram of a converter circuit with the power factor correction provided according to the present disclosure. The simulation of the output power is from 50W to 200W, and the power factor (PF) is from 0.88 to 0.957 correspondingly. As shown in FIG. 8, the converter circuit 200 reduces the voltage stress, increase the life, increases the power converting efficiency, and avoids breaking an output capacitor when AC input voltage is over high, and further increases a region of the AC input voltage.

In the following embodiments, the different parts from FIG. 2 are illustrated, and anything else is omitted.

In the next two embodiments, the buck converter circuits with power factor correction are illustrated.

Figure 9:
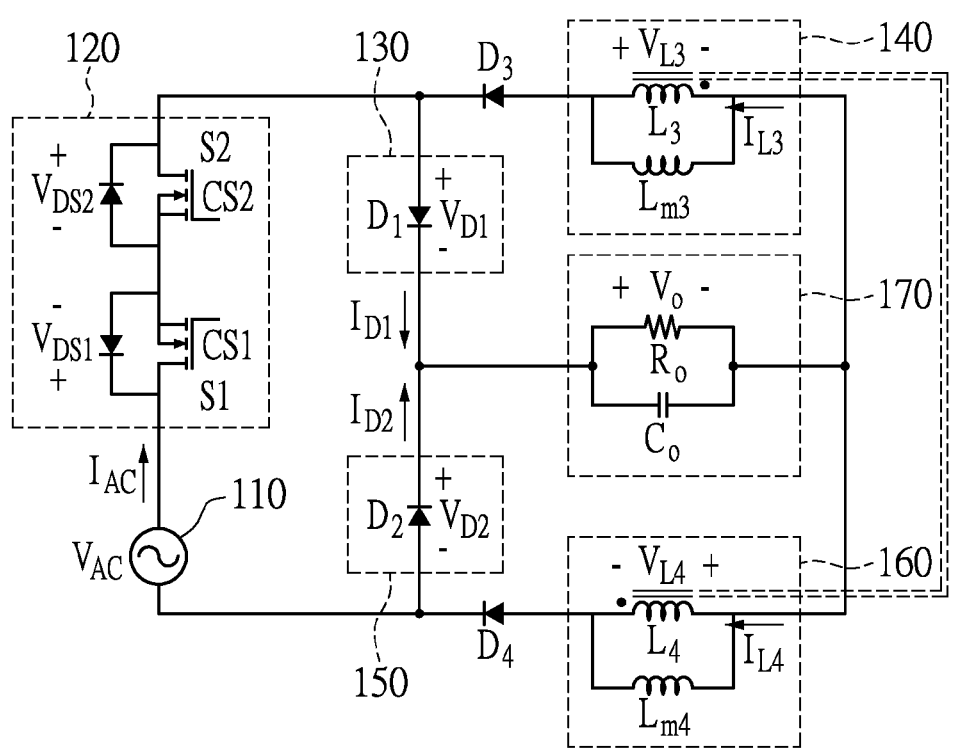
FIG. 9 is another detail circuit diagram of the converter circuit with the power factor correction provided according to the present disclosure.

Referring to FIG. 9. FIG. 9 is another detailed circuit diagram of the converter circuit with the power factor correction provided according to the present disclosure. The difference of FIG. 9 from FIG. 2 is that the converter circuit 900 with power factor correction is a buck circuit. The converter circuit 900 includes a third free-wheeling diode $D_3$ and fourth free-wheeling diode $D_4$. The first energy storing 140 includes a third inductor $L_3$ and a third magnetizing inductor $L_{m3}$. The second energy storing 160 includes a fourth inductor $L_4$ and a fourth magnetizing inductor $L_{m4}$.

The cathode of the third free-wheeling diode $D_3$ couples to the anode of the first free-wheeling diode $D_1$, the anode of the third free-wheeling diode $D_3$ couples to the end of the first energy storing circuit 140. The cathode of the fourth free-wheeling diode $D_4$ couples to the anode of the second free-wheeling diode $D_2$, the anode of the fourth free-wheeling diode $D_4$ couples to the end of the second energy storing circuit 160. An end of the third inductor $L_3$ couples to the anode of the third free-wheeling diode $D_3$ and has a common-polarity input terminal. Another end of the third inductor $L_3$ couples to another end of the output resistor $R_O$. The third magnetizing inductor $L_{m3}$ parallel connects to the third inductor $L_3$ and is configured for storing energy (e.g., stored with magnetic flux form). An end of the fourth inductor $L_4$ couples to the anode of the fourth free-wheeling diode $D_4$ and has a common-polarity output terminal, and another end of the fourth inductor $L_4$ couples to another end of the output resistor $R_O$. The fourth magnetizing inductor $L_{m4}$ parallel connects to the fourth inductor $L_4$, configured for storing energy (e.g., stored with magnetic flux form). The third inductor $L_3$ and the fourth inductor $L_4$ are in different windings and use the shared core to form a transformer. Thus, the third inductor $L_3$ and the fourth inductor $L_4$ have a mutual effect or a coupling effect therebetween. It is worth noting, the common-polarity input terminal of the third inductor $L_3$ and the common-polarity output terminal of the fourth inductor $L_4$ are different from the first inductor $L_1$ and the second inductor $L_2$ shown in the embodiment of FIG. 2.

Next, the operation of the converter circuit 900 with power factor correction is illustrated.

Figure 10:
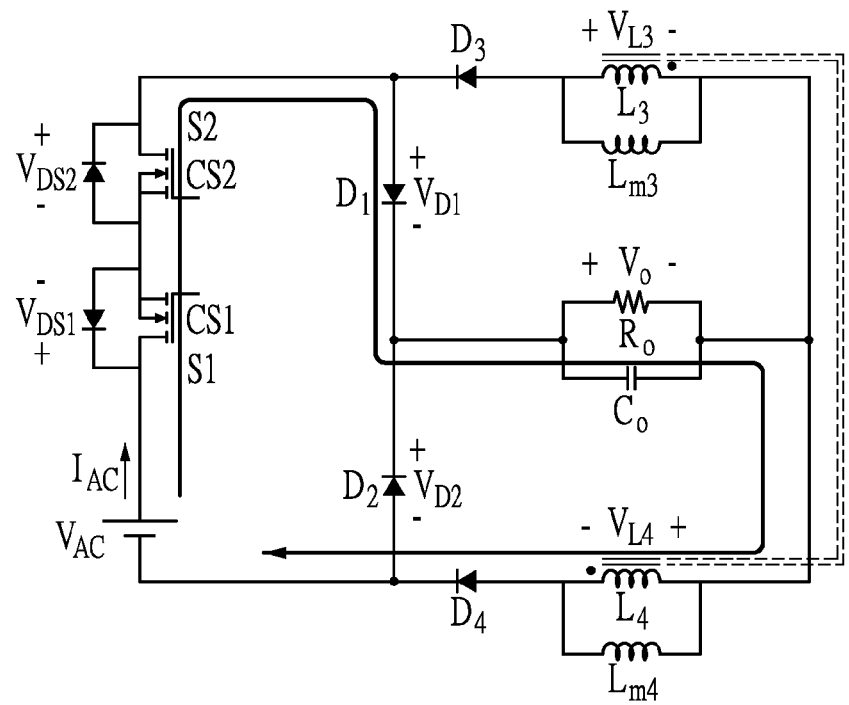
FIG. 10 and FIG. 11 are signal operation diagrams about the AC input voltage on the converter circuit with the power factor correction provided according to the present disclosure being the positive part of a wave.
Figure 11:
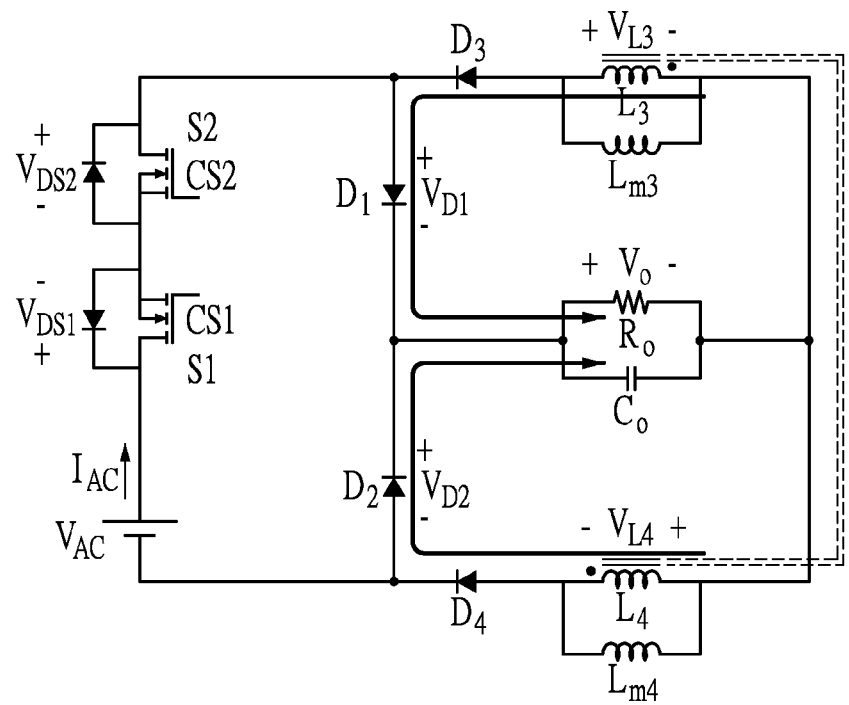
Figure 12:
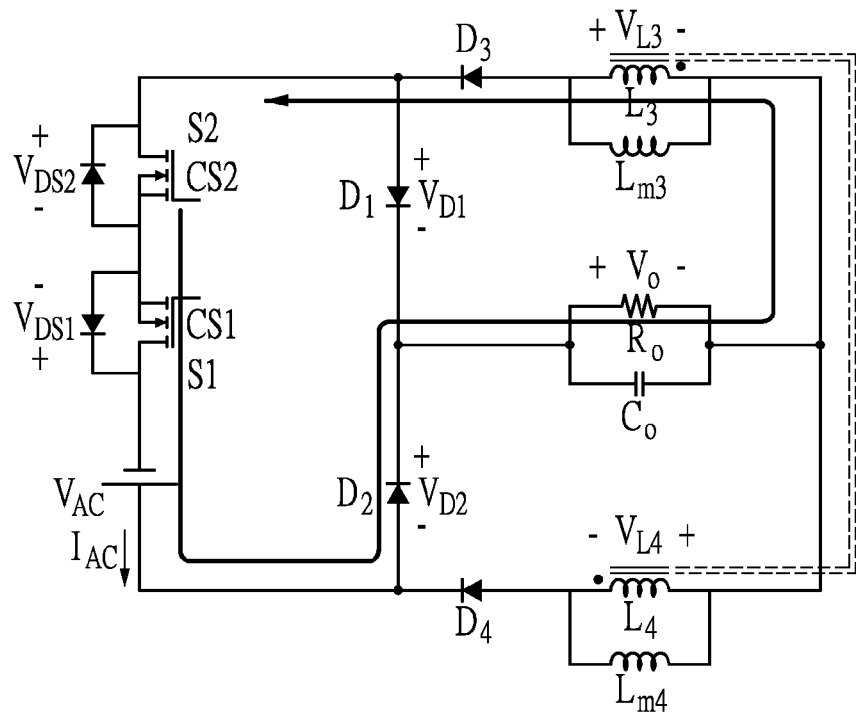
FIG. 12 and FIG. 13 are signal operation diagrams about the AC input voltage on the converter circuit with the power factor correction provided according to the present disclosure being the negative part of the wave.
Figure 13:
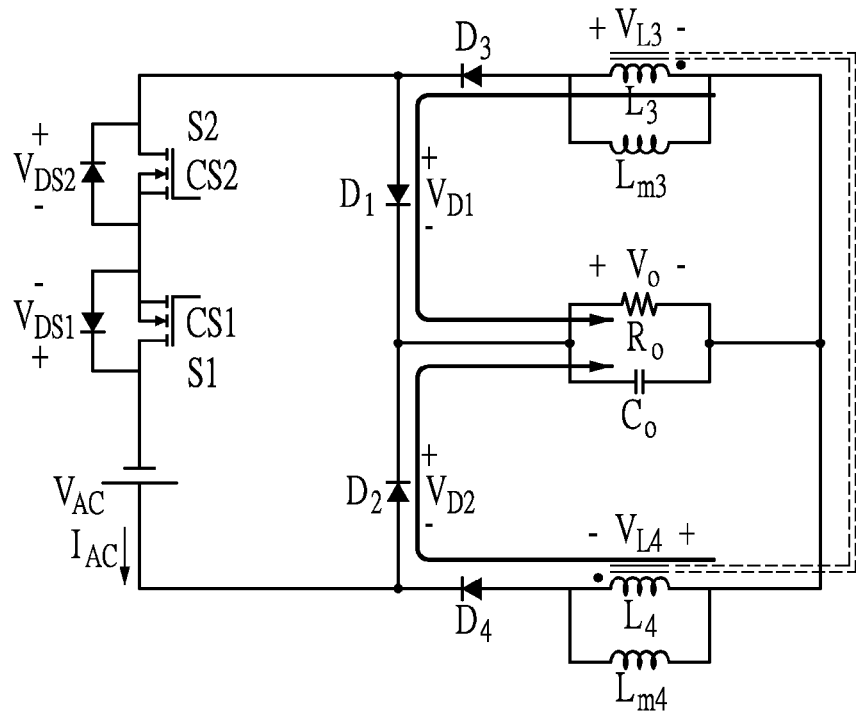

Referring to FIG. 10 and FIG. 11 in conjunction with FIG. 9. FIG. 10 and FIG. 11 are signal operation diagrams about the AC input voltage on the converter circuit with the power factor correction provided according to the present disclosure is the positive part of a wave. When the first power switch S1 and the second power switch S2 are on-state as long as the AC input voltage $V_{AC}$ is the positive part of the wave, the fourth magnetizing inductor $L_{m4}$ is charged by the AC input current $I_{AC}$ through the path formed by the first power switch S1 and the second power switch S2, the first free-wheeling diode $D_1$, the output capacitor $C_O$ and fourth magnetizing inductor $L_{m4}$ in order (shown as FIG. 4), wherein the third inductor $L_3$ and the fourth inductor $L_4$ have inductor voltages $V_{L3}$ and $V_{L4}$ respectively. When the first power switch S1 and the second power switch S2 are off-state as long as the AC input voltage $V_{AC}$ is the positive part of the wave, the third magnetizing inductor $L_{m3}$ releases the energy to the output resistor $R_O$ and the output capacitor $C_O$ by the first free-wheeling diode $D_1$ and the third free-wheeling diode $D_3$, and the fourth magnetizing inductor $L_{m4}$ releases the energy to the output resistor $R_O$ and the output capacitor $C_O$ by the second free-wheeling diode $D_2$ and the fourth free-wheeling diode $D_4$ (shown as FIG. 11). Please refer to FIG. 12 and FIG. 13 in conjunction with FIG. 9. FIG. 12 and FIG. 13 are signal operation diagrams about the AC input voltage on the converter circuit with the power factor correction provided according to the present disclosure being the negative part of the wave. When the first power switch S1 and the second power switch S2 are on-state as long as the AC input voltage $V_{AC}$ is the negative part of the wave, the third magnetizing inductor $L_{m3}$ is charged by the AC input current $I_{AC}$ through the path formed by the second free-wheeling diode $D_2$, the output resistor $R_O$, the third magnetizing inductor $L_{m3}$, the second power switch S2 and the first power switch S1 in order (shown as FIG. 12). When the first power switch S1 and the second power switch S2 are off-state as long as the AC input voltage $V_{AC}$ is the negative part of the wave, the third magnetizing inductor $L_{m3}$ releases the energy to the output resistor $R_O$ and the output capacitor $C_O$ by the first free-wheeling diode $D_1$ and the third free-wheeling diode $D_3$, and the fourth magnetizing inductor $L_{m4}$ releases the energy to the output resistor $R_O$ and the output capacitor $C_O$ by the second free-wheeling diode $D_2$ and the fourth free-wheeling diode $D_4$ (shown as FIG. 13). Therefore, the converter circuit 900 avoids breaking an output capacitor when AC input voltage is over high, and increases a region of the AC input voltage. In addition, the converter circuit 900 can reduce the voltage stress, increase the life, and increase the power converting efficiency.

In the following embodiments, the different parts from FIG. 9 are illustrated, and anything else is omitted.

Figure 14:
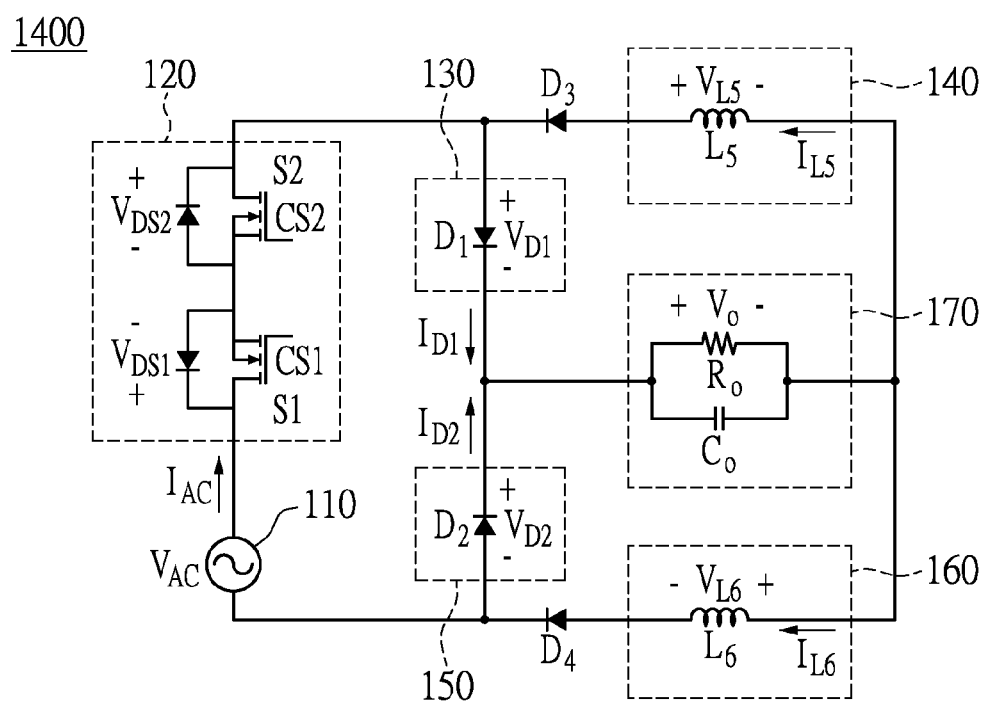
FIG. 14 is another detail circuit diagram of the converter circuit with the power factor correction provided according to the present disclosure.

Referring to FIG. 14. FIG. 14 is another detailed circuit diagram of the converter circuit with power factor correction provided according to the present disclosure. The converter circuit 1400 with power factor correction is also the buck circuit. The difference of FIG. 14 from FIG. 9 is that the first energy storing circuit 140 includes a fifth inductor $L_5$ and the second energy storing circuit 160 includes a sixth inductor $L_6$. It is worth noting, there is not any mutual effect or coupling effect. In other words, the fifth inductor $L_5$ and the sixth inductor $L_6$ use different cores. Thus, the common-polarity terminals do not exist.

An end of the fifth inductor $L_5$ couples to the anode of the third free-wheeling diode $D_3$, another end of the fifth inductor $L_5$ couples to another end of the output resistor $R_O$. An end of the sixth inductor $L_6$ couples to the anode of the fourth free-wheeling diode $D_4$, another end of the sixth inductor $L_6$ couples to another end of the output resistor $R_O$. Next, the operation of the converter circuit 1400 with the power factor correction is illustrated.

Figure 15:
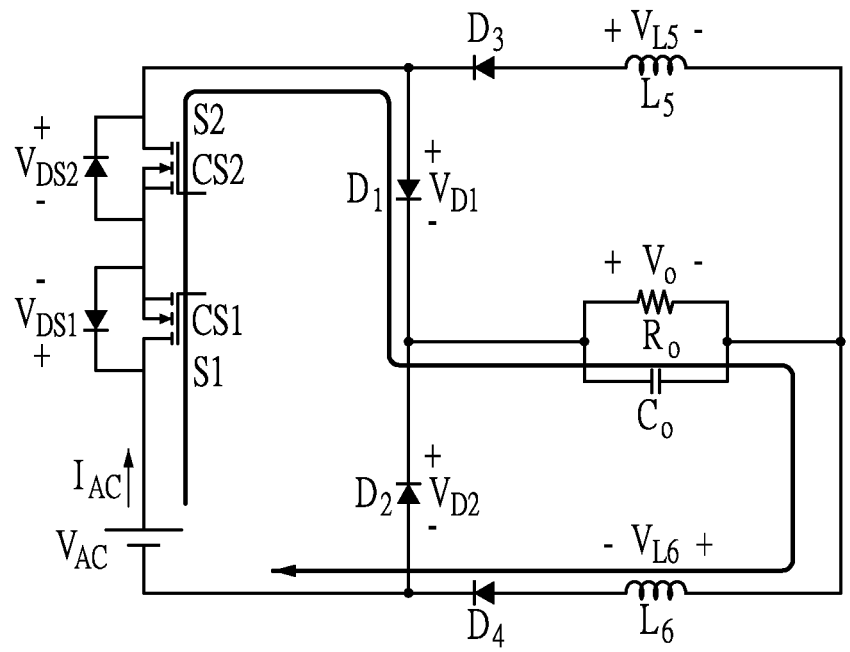
FIG. 15 and FIG. 16 are signal operation diagrams about the AC input voltage on the converter circuit with the power factor correction provided according to the present disclosure is the positive part of a wave.
Figure 16:
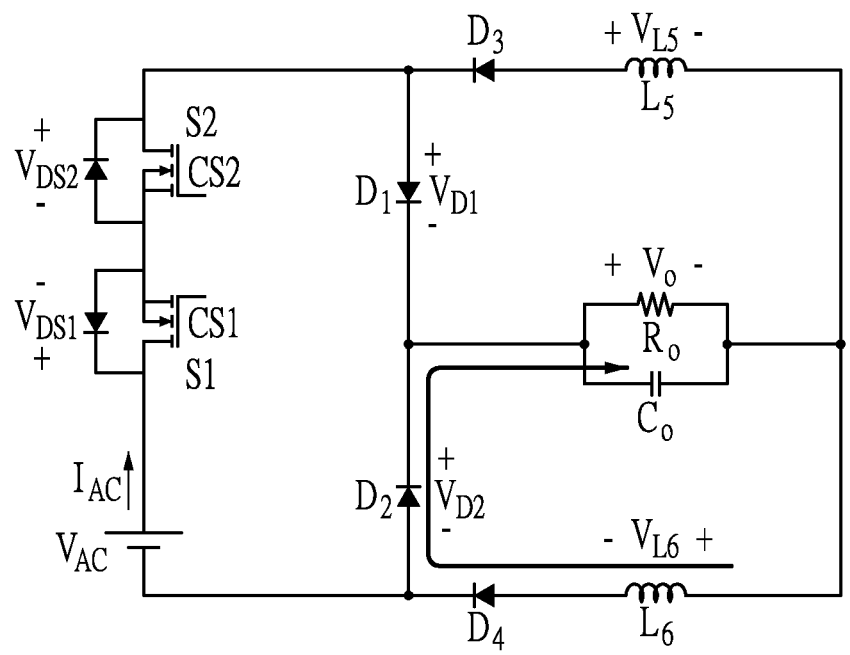
Figure 17:
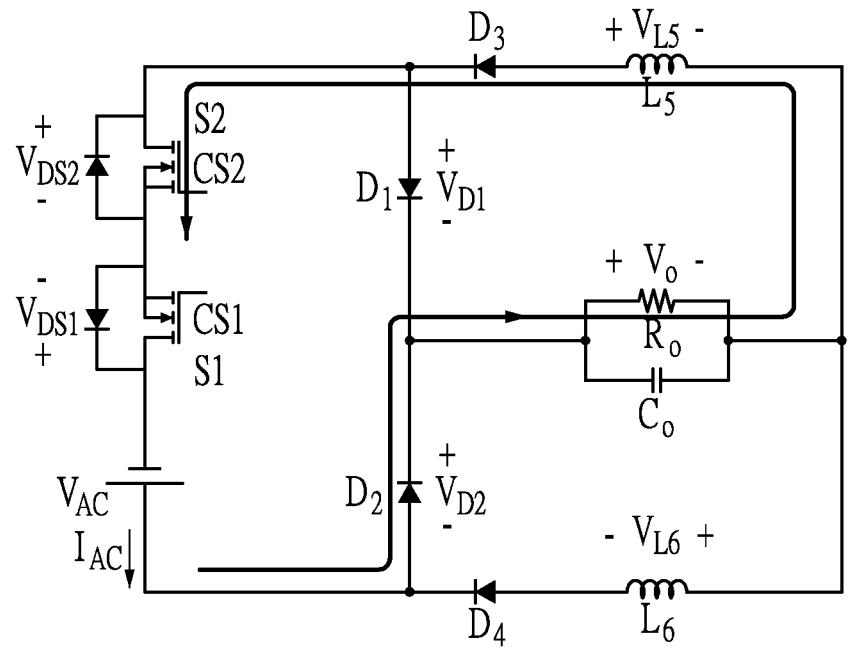
FIG. 17 and FIG. 18 are signal operation diagrams about the AC input voltage on the converter circuit with the power factor correction provided according to the present disclosure being the negative part of the wave.
Figure 18:
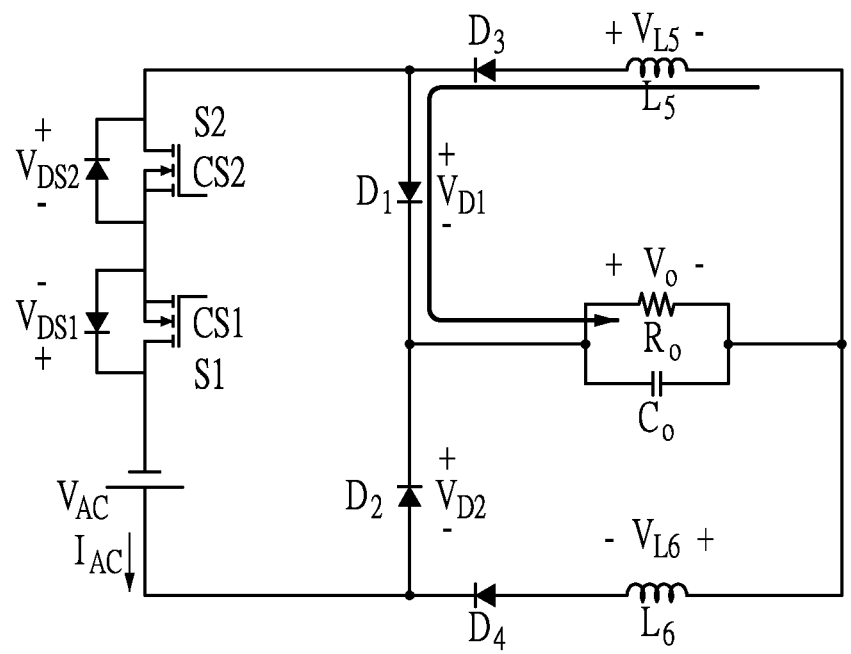

Referring to FIG. 15 and FIG. 16 in conjunction with FIG. 14. FIG. 15 and FIG. 16 are signal operation diagrams about the AC input voltage on the converter circuit with the power factor correction provided according to the present disclosure being the positive part of a wave. When the first power switch S1 and the second power switch S2 are on-state as long as the AC input voltage $V_{AC}$ is the positive part of the wave, the sixth inductor $L_{m6}$ is charged by the AC input current $I_{AC}$ through the path formed by the first power switch S1 and the second power switch S2, the first free-wheeling diode $D_1$, the output capacitor $C_O$ and the sixth inductor $L_6$ in order (shown as FIG. 15). When the first power switch S1 and the second power switch S2 are off-state as long as the AC input voltage $V_{AC}$ is the positive part of the wave, the sixth inductor $L_6$ releases the energy to the output resistor $R_O$ and the output capacitor $C_O$ by the second free-wheeling diode $D_2$ and the fourth free-wheeling diode $D_4$ (shown as FIG. 16). Please refer to FIG. 17 and FIG. 18 in conjunction with FIG. 14. FIG. 17 and FIG. 18 are signal operation diagrams about the AC input voltage on the converter circuit with the power factor correction provided according to the present disclosure being the negative part of the wave. When the first power switch S1 and the second power switch S2 are on-state as long as the AC input voltage $V_{AC}$ is the negative part of the wave, the third magnetizing inductor $L_{m3}$ is charged by the AC input current $I_{AC}$ through the path formed by the second free-wheeling diode $D_2$, the output resistor $R_O$, the fifth inductor $L_5$, the second power switch S2 and the first power switch S1 in order (shown as FIG. 17). When the first power switch S1 and the second power switch S2 are off-state as long as the AC input voltage $V_{AC}$ is the negative part of the wave, the fifth inductor $L_5$ releases the energy to the output resistor $R_O$ and the output capacitor $C_O$ by the second free-wheeling diode $D_2$ and the fourth free-wheeling diode $D_4$ (shown as FIG. 18).

To sum up, in the converter circuit with power factor correction provided by the present disclosure, when the bidirectional AC switch circuit is on-state, at least one of the first energy storing circuit and the second energy storing circuit is charged by the AC input current and then energy is stored with magnetic flux form; when the bidirectional AC switch circuit is off-state, at least one of the first energy storing circuit and the second energy storing circuit releases the energy to the output circuit. Therefore, the converter circuit avoids breaking an output capacitor when AC input voltage is over high, and increases a region of the AC input voltage.

The zero crossing distortion can be cancelled by a coupling effect between inductors in the embodiments of each converter circuit with power factor correction provided by the present disclosure, to decrease the total harmonic distortion and increase the power factor.

The embodiments of each converter circuit with power factor correction provided by the present disclosure can reduce the voltage stress, increase the life, and increase the power converting efficiency.

The embodiments of each converter circuit with power factor correction provided by the present disclosure can control the input inrush current and further curb the arc that occurs when the power is plugged or unplugged.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A converter circuit with power factor correction, configured for converting an alternative current (AC) input voltage into a direct current (DC) output voltage, comprising:
   an AC voltage source, configured for operatively outputting the AC input voltage and an AC input current;
   a bidirectional AC switch circuit, electronically connected to an end of the AC voltage source, the bidirectional AC switch circuit receiving a first control signal and a second control signal, and controlling the input current;
   a first un-bidirectional channel circuit, an end of the first un-bidirectional channel circuit electronically connecting to the bidirectional AC switch circuit;
   a first energy storing circuit, an end of the first energy storing circuit electronically connecting to the first un-bidirectional channel circuit;
   a second un-bidirectional channel circuit, an end of the second un-bidirectional channel circuit electronically connecting to another end of the first un-bidirectional channel circuit, and another end of the second un-bidirectional channel circuit electronically connecting to another end of the AC voltage source;
   a second energy storing circuit, an end of the second energy storing circuit electronically connecting to another end of the second un-bidirectional channel circuit, and another end of the second energy storing circuit electronically connecting to another end of the first energy storing circuit;
   an output circuit, an end of the output circuit electronically connecting to another end of the first un-bidirectional channel circuit, another end of the output circuit electronically connecting to another end of the first energy storing circuit, the output circuit operatively outputting the DC output voltage;
   wherein when the bidirectional AC switch circuit is on-state, at least one of the first energy storing circuit and the second energy storing circuit is charged by the AC input current and then energy is stored with magnetic flux form; when the bidirectional AC switch circuit is off-state, at least one of the first energy storing circuit and the second energy storing circuit releases the energy to the output circuit.

2. The converter circuit according to claim 1, wherein when the bidirectional AC switch circuit is on-state as long as the AC input voltage is a positive part of a wave, at least one of the first energy storing circuit and the second energy storing circuit is charged by the AC input current and then energy is stored with magnetic flux form, when the bidirectional AC switch circuit is off-state as long as the AC input voltage is the positive part of the wave, at least one of the first energy storing circuit and the second energy storing circuit releases the energy to the output circuit; or when the bidirectional AC switch circuit is on-state as long as the AC input voltage is a negative part of the wave, at least one of the first energy storing circuit and the second energy storing circuit is charged by the AC input current and then energy is stored with the magnetic flux form, when the bidirectional AC switch circuit is off-state as long as the AC input voltage is the negative part of the wave, at least one of the first energy storing circuit and the second energy storing circuit releases the energy to the output circuit.

3. The converter circuit according to claim 2, wherein the bidirectional AC switch circuit comprises:
   a first power switch, the gate of the first power switch receiving the first control signal, the drain of the first power switch coupling to the end of the AC voltage source, the state of the first power switch being decided according to a level of the first control signal to be on-state or off-state;
   a second power switch, the gate of the second power switch receiving the second control signal, the source of the second power switch coupling to the source of the first power switch, the drain of the second power switch coupling to the end of the first un-bidirectional channel circuit, the state of the second power switch being decided according to a level of the second control signal to be on-state or off-state.

4. The converter circuit according to claim 3, wherein the first un-bidirectional channel circuit comprises a first free-wheeling diode, the anode of the first free-wheeling diode coupling to the drain of the second power switch, the cathode of the first free-wheeling diode coupling to the end of the second un-bidirectional channel circuit; the second un-bidirectional channel circuit comprises a second free-wheeling diode, the anode of the second free-wheeling diode coupling to another end of the AC voltage source, the cathode of the second free-wheeling diode coupling to the cathode of the first free-wheeling diode; the output circuit comprises an output resistor and an output capacitor, an end of the output resistor coupling to the cathode of the second free-wheeling diode, another end of the output resistor coupling to another end of the first energy storing circuit, two ends of the output resistor generating the DC output voltage; and an end of the output capacitor couples to the cathode of the second free-wheeling diode, another end of the output capacitor couples to another end of the first energy storing circuit.

5. The converter circuit according to claim 4, wherein the first energy storing circuit comprises:
a first inductor, an end of the first inductor coupling to the anode of the first free-wheeling diode, another end of the first inductor coupling to another end of the output resistor and having a common-polarity input terminal;
a first magnetizing inductor, parallel connecting to the first inductor, configured for storing energy.

6. The converter circuit according to claim 5, wherein the second energy storing circuit comprises:
a second inductor, an end of the second inductor coupling to the anode of the second free-wheeling diode and having a common-polarity output terminal, and another end of the second inductor coupling to another end of the output resistor;
a second magnetizing inductor, parallel connecting to the second inductor, configured for storing energy,
wherein when the first power switch and the second power switch are on-state as long as the AC input voltage is the positive part of the wave, the first magnetizing inductor and the second magnetizing inductor are charged by the AC input current, and when the first power switch and the second power switch are off-state as long as the AC input voltage is the positive part of the wave, the second magnetizing inductor releases the energy to the output resistor and the output capacitor by the second free-wheeling diode, wherein the first inductor releases the energy to the second inductor by a coupling effect.

7. The converter circuit according to claim 6, wherein when the first power switch and the second power switch are on-state as long as the AC input voltage is the negative part of the wave, the first magnetizing inductor and the second magnetizing inductor are charged by the AC input current, and when the first power switch and the second power switch are off-state as long as the AC input voltage is the negative part of the wave, the first magnetizing inductor releases the energy to the output resistor and the output capacitor by the first free-wheeling diode, wherein the second inductor releases the energy to the first inductor by a coupling effect.

8. The converter circuit according to claim 6, wherein when the AC input voltage is less than the DC output voltage, the converter circuit cancels a zero crossing distortion (ZCS) by the coupling effect between the first inductor and the second inductor to decrease a total harmonic distortion and increase the power factor.

9. The converter circuit according to claim 7, wherein when the AC input voltage is less than the DC output voltage, the converter circuit cancels a zero crossing distortion by the coupling effect between the first inductor and the second inductor to decrease a total harmonic distortion and increase the power factor.

10. The converter circuit according to claim 4, further comprising:
a third free-wheeling diode, the cathode of the third free-wheeling diode coupling to the anode of the first free-wheeling diode, the anode of the third free-wheeling diode coupling to the end of the first energy storing circuit; and
a fourth free-wheeling diode, the cathode of the fourth free-wheeling diode coupling to the anode of the second free-wheeling diode, the anode of the fourth free-wheeling diode coupling to the end of the second energy storing circuit.

11. The converter circuit according to claim 10, wherein the first energy storing comprises:
a third inductor, an end of the third inductor coupling to the anode of the third free-wheeling diode and having a common-polarity input terminal, another end of the third inductor coupling to another end of the output resistor;
a third magnetizing inductor, parallel connecting to the third inductor, configured for storing energy.

12. The converter circuit according to claim 11, wherein the second energy storing comprises:
A fourth inductor, an end of the fourth inductor coupling to the anode of the fourth free-wheeling diode and having a common-polarity output terminal, another end of the fourth inductor coupling to another end of the output resistor;
a fourth magnetizing inductor, parallel connecting to the fourth inductor, configured for storing energy,
wherein when the first power switch and the second power switch are on-state as long as the AC input voltage is the positive part of the wave, the fourth magnetizing inductor is charged by the AC input current, and when the first power switch and the second power switch are off-state as long as the AC input voltage is the positive part of the wave, the third magnetizing inductor releases the energy to the output resistor and the output capacitor by the first free-wheeling diode and the third free-wheeling diode, and the fourth magnetizing inductor releases the energy to the output resistor and the output capacitor by the second free-wheeling diode and the fourth free-wheeling diode.

13. The converter circuit according to claim 12, wherein when the first power switch and the second power switch are on-state as long as the AC input voltage is the negative part of the wave, the third magnetizing inductor is charged by the AC input current, and when the first power switch and the second power switch are off-state as long as the AC input voltage is the negative part of the wave, the third magnetizing inductor releases the energy to the output resistor and the output capacitor by the first free-wheeling diode and the third free-wheeling diode, and the fourth magnetizing inductor releases the energy to the output resistor and the output capacitor by the second free-wheeling diode and the fourth free-wheeling diode.

14. The converter circuit according to claim 4, wherein the first energy storing comprises:

a fifth inductor, an end of the fifth inductor coupling to the anode of the third free-wheeling diode, another end of the fifth inductor coupling to another end of the output resistor.

15. The converter circuit according to claim 14, wherein the second energy storing comprises:
a sixth inductor, an end of the sixth inductor coupling to the anode of the fourth free-wheeling diode, another end of the sixth inductor coupling to another end of the output resistor,
wherein when the first power switch and the second power switch are on-state as long as the AC input voltage is the positive part of the wave, the sixth inductor is charged by the AC input current, and when the first power switch and the second power switch are off-state as long as the AC input voltage is the positive part of the wave, the sixth inductor releases the energy to the output resistor and the output capacitor by the second free-wheeling diode and the fourth free-wheeling diode.

16. The converter circuit according to claim 15, wherein when the first power switch and the second power switch are on-state as long as the AC input voltage is the negative part of the wave, the fifth inductor is charged by the AC input current, and when the first power switch and the second power switch are off-state as long as the AC input voltage is the negative part of the wave, the fifth inductor releases the energy to the output resistor and the output capacitor by the second free-wheeling diode and the fourth free-wheeling diode.

\* \* \* \* \*